Oct. 21, 1930.  A. H. G. FOKKER  1,778,892
METHOD AND MEANS OF CONTROLLING THE OPERATION OF AIRCRAFT
Filed Sept. 23, 1925  2 Sheets-Sheet 2
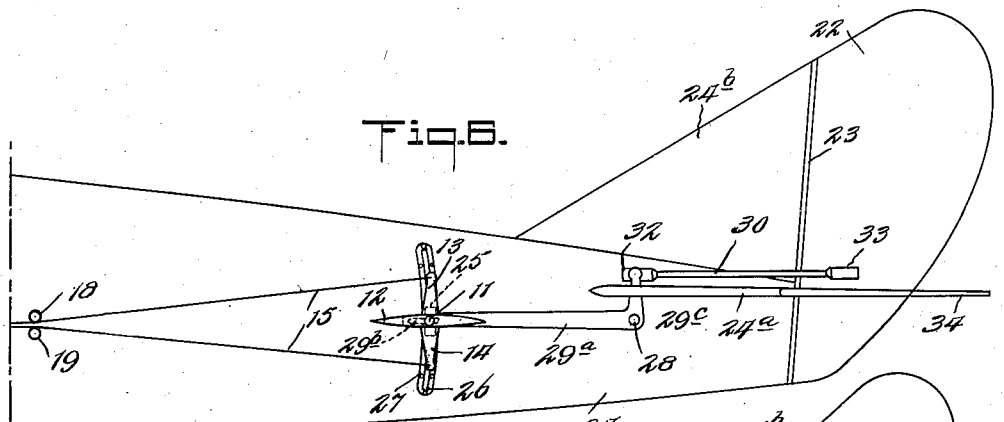
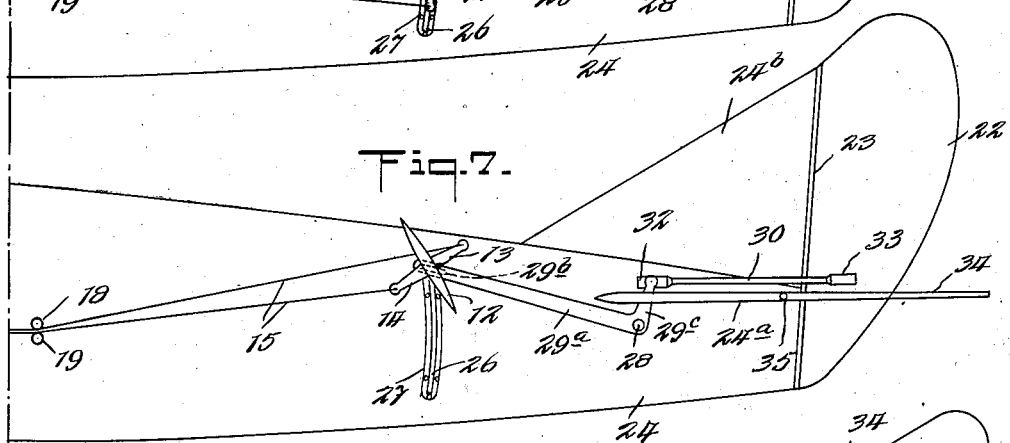
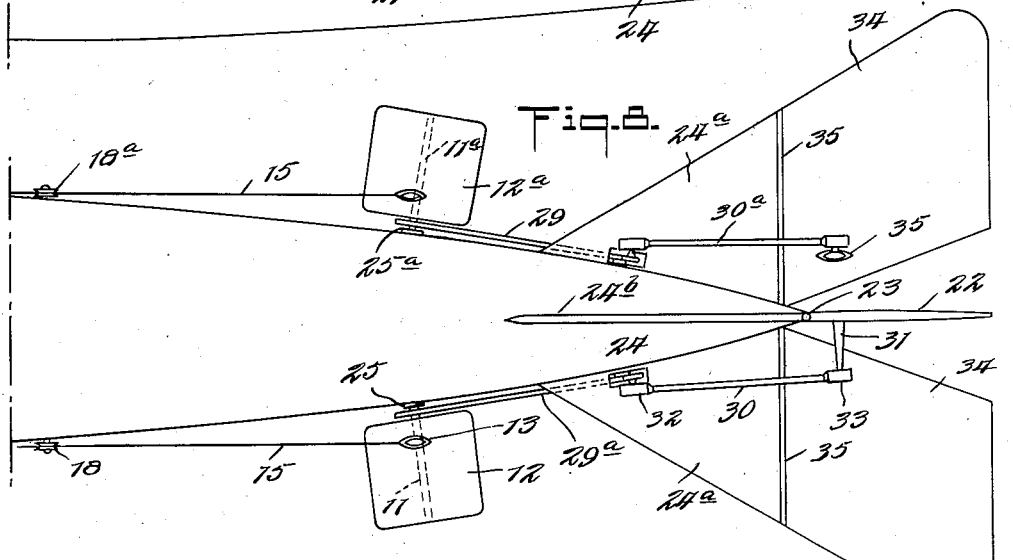
INVENTOR.
Anthony H. G. Fokker
BY
ATTORNEY.

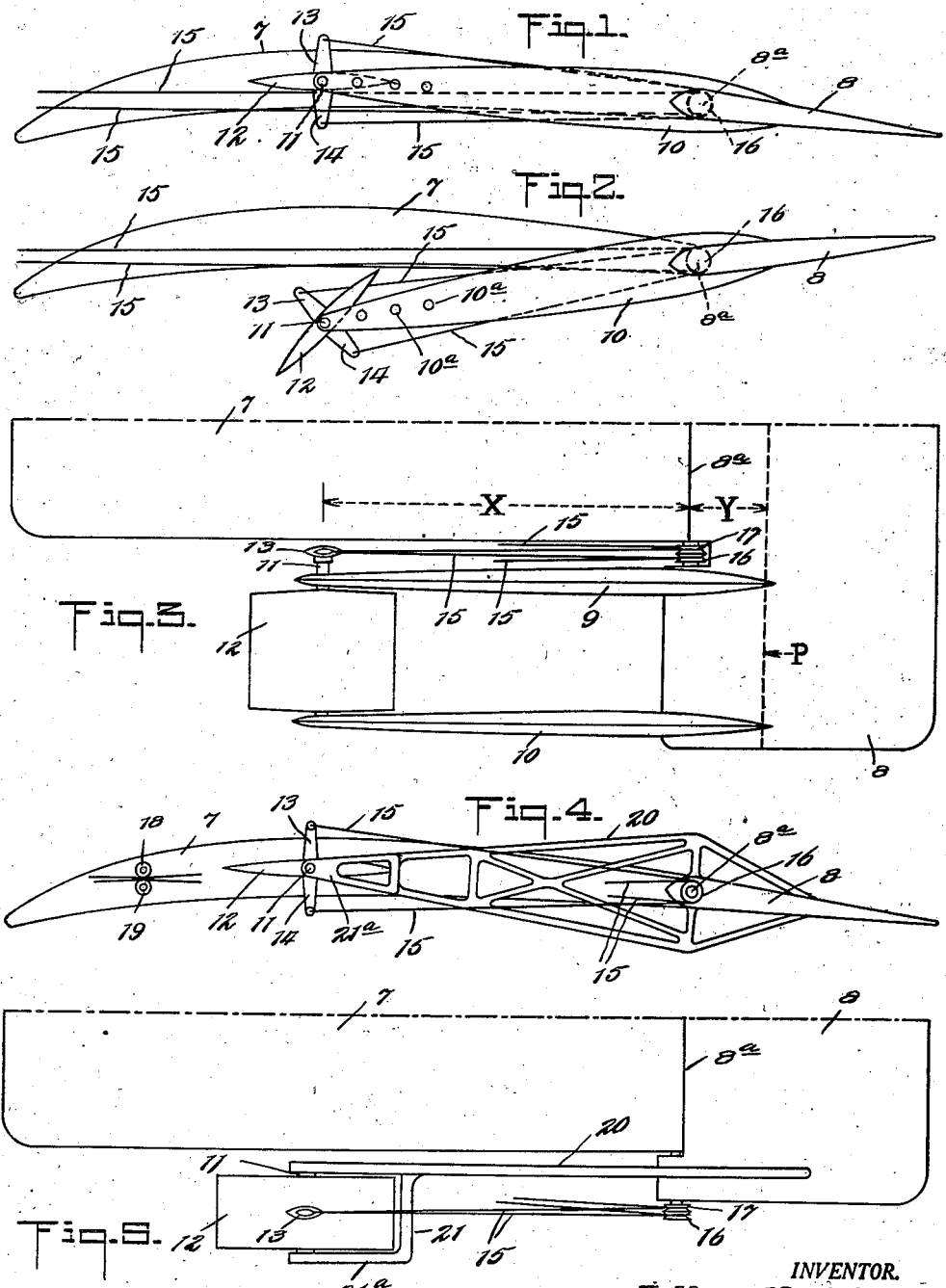

Patented Oct. 21, 1930

1,778,892

UNITED STATES PATENT OFFICE

ANTHONY HERMAN GERARD FOKKER, OF AMSTERDAM, NETHERLANDS, ASSIGNOR TO GENERAL AVIATION CORPORATION, A CORPORATION OF DELAWARE

METHOD AND MEANS OF CONTROLLING THE OPERATION OF AIRCRAFT

Application filed September 23, 1925. Serial No. 58,027.

The present invention relates generally to aircraft, whether of the heavier-than-air or the lighter-than-air type, and is more especially directed to a method and means of governing or guiding their movements in flight, through the medium of movable surfaces embodied in or associated with the aircraft structure.

While, as stated, the present invention is applicable to any type of air or marine craft or any vehicle in which the pressure of a gas or fluid against a movably mounted surface is utilized as a medium for directional control in the operation thereof, for the purposes of the present disclosure, I have elected to illustrate and specifically set forth the advantages and modus operandi of my invention as it relates to craft of the heavier-than-air type of conventional design.

Therefore, referring specifically to an airplane, as a general type, it is well known that the proper and safe actuation of the ailerons, rudder and elevator by the present manual means, is becoming a greater problem as the planes increase in size to meet the demands for greater load capacities. With the increase in the wing area, there must be a corresponding increase in the dimensions of the control surfaces, and it will be obvious that as the area of the latter is enlarged, the resistance created by the forces acting upon the surfaces thereof is multiplied, thereby entailing greater physical effort in initiating and governing their movements.

As the actuating media for the control surfaces are at present constituted, it is fast becoming impossible for aviators or pilots of large craft to manipulate those surfaces with that degree of facility and despatch which are essential to substantially instantaneous directional changes and efficient and safe flight, and the existing methods of operation of the control surfaces are therefore more or less a limiting factor in the development of airplanes having supporting surfaces of the dimensions requisite to many of the requirements of commercial aviation.

The general object of the present invention is to overcome the disadvantages which are inherent in the present methods of manipulating the control surfaces, in a simple and economical manner, the method and means of attaining this object being susceptible of incorporation in existing types of craft, without effecting changes in their design, thus imparting to my invention a broad field of utility.

More specifically, my invention is directed to a method and means of actuating the control surfaces of aircraft, as set forth, whereby changes in movement of the aircraft on its longitudinal, vertical and transverse axes may be effected with a minimum of physical effort on the part of the operator, the forces created in flight being utilized to perform the major work in a manner which will insure quicker and more positive control than is now possible, especially in craft of relatively large wing spreads.

In the practicing of my invention, as above stated, I have devised an efficient method and means of effecting directional control of air craft and the like by availing myself of multiplied leverage forces which are developed by the movement of a small surface in response to the air or fluid impinging thereagainst, to actuate the usual control surfaces, such as the ailerons, rudder, elevator or the like, the initial movement of the aforesaid small surface to the required work-performing positions being accomplished manually with a minimum of effort on the part of the operator of the craft.

My invention further contemplates a method and means for functioning the control surfaces of aircraft and the like, by utilizing the forces created in flight, by the manual or mechanical operation of elements associated with the aircraft to produce or develop power for performing the required work in the movement of the said control surfaces.

My invention also comprehends a method and means of functioning the control surfaces of aircraft, having the characteristics and advantages hereinbefore set forth, in which provision may be made for increasing or diminishing the work capacity of the actuating elements in a simple manner, to meet the requirements of practical use.

Other objects and advantages flowing from the practicing of my invention, will present themselves as the description proceeds, and I would have it clearly understood that I reserve unto myself all rights to the full range of equivalents, both in structure and in use, to which I may be entitled under my invention in its broadest aspect.

As previously pointed out, for the purpose of presenting a clear and concise description of my invention, I have confined my discussion of the prior art and the objects and advantages of the present invention to the heavier-than-air type of machine, and in the drawings, I have shown certain means or mechanisms whereby my invention may be practiced in the functioning of the ailerons, rudder and elevator of an airplane. However, these are simply illustrative and not in any sense limitations of my invention, as it will be manifest to those skilled in the art that the means for practicing the method of functioning the control surfaces, which I have evolved, may take other forms, within the scope and spirit of my invention, as defined in the appended claims.

In the several views of the drawings, which are schematic,

Figure 1, shows a means for actuating an aileron, with the latter at a zero angle of incidence.

Figure 2 is a showing similar to Figure 1 in which the aileron has been moved to a negative angle of incidence.

Figure 3 is a top plan view of the structure shown in the preceding figures.

Figures 4 and 5 are respectively side and top plan views of a modified means for functioning the ailerons or flaps of an airplane, in which the ailerons are shown at a zero angle of incidence.

Figure 6 illustrates a means for actuating the rudder, the parts being in neutral or normal position.

Figure 7 illustrates the relative positions of the elements of the mechanism shown in Figure 6, when the actuator has been moved to function the rudder, and, Figure 8 is a top plan view of the tail of an airplane of conventional design, showing relatively independent means for actuating the rudder and the elevator, one actuator being located on each side of the fuselage.

Referring now to the drawings in detail, in which like characters of reference are employed to designate similar parts in the several views, and particularly to the showing of Figures 1 to 3, inclusive, 7 indicates the wing or supporting surface of an airplane of the conventional type, which is provided with the usual recessed aileron or flap 8 for controlling the movement of the airplane about its longitudinal axis, the said aileron or flap being hinged to the wing at $8^a$ in accordance with standard practice.

As will be noted, the span of the aileron 8 is greater than the length of the wing recess within which it is located, so that it projects beyond the end of the wing, as clearly shown in Figure 3. Fixed to the protruding portion of the aileron 8 and extending forwardly from the leading edge thereof, are a pair of preferably parallel arms 9 and 10, each of which may be apertured as shown at $10^a$.

Mounted for rotation between the arms 9 and 10 upon a suitable axle or shaft 11, the ends of which are positioned in the oppositely disposed apertures $10^a$ of said arms, forming bearings for said axle or shaft, is a surface 12, which will hereinafter be termed the actuator, and which may be of any suitable outline, the dimensions and camber thereof being determined by the work which it is to perform as hereinafter explained.

For rotating the actuator 12 within its supports, I preferably provide it with levers or arms 13 and 14, as shown, to which suitable wires or cables 15 are attached or connected, these wires or cables traveling upon the pulleys 16 and 17 located concentric with the axis of the aileron hinge $8^a$, and between the pulleys 18 and 19, located at any suitable point in the struts, fuselage or elsewhere in the structure, for connection to the operating device, which may be a lever, as the so-called joy-stick (not shown).

From the foregoing description, it will be apparent that the actuator 12, by the manipulation of the lever or joy-stick to which the wires or cable 15 are connected, may be rotated or rocked between the supporting arms 9 and 10 to a positive or to a negative angle of incidence, as may be desired, the air impinging against the inclined surface of the actuator, through the medium of the arms 9 and 10, effecting the movement of the flap or aileron 8 on its hinge $8^a$ to a negative or positive angle of incidence, as the case may be. In other words, the axis of the hinge line $8^a$ is the fulcrum to which the power produced at the actuator translated into forces of leverage, is applied to the work, the mechanical advantage available for raising or lowering the flap or aileron being $\frac{X}{Y}$ as shown in Figure 3, or the distance from the axis of the hinge $8^a$ divided by the distance from the latter to the center of pressure line of the aileron or flap, the latter line being indicated at P.

Therefore, it will be manifest that the work may be accomplished with a relatively small application of power at the outer end of the lever X. By this arrangement, the actuator 12 may be of comparatively small dimensions so that it may be rotated to the proper work-performing angle with little manual effort on the part of the aviator who moves the operating lever or joy-stick in the customary manner, the pressure of the air upon the small surface of the actuator with leverage, such as aforesaid, available, permitting the aviator to instantaneously and positively function an aileron of much greater area than can be conveniently and properly manipulated by existing means.

The arms 9 and 10 may be of any configuration and material suitable to the purpose which they are intended to serve, it being obvious that they must be of a non-yielding or rigid construction. It will also be seen that the effective leverage may be changed or varied by changing the location of the shaft or axle 11 within the bearing-forming apertures 10ʰ of said arms, the number of apertures being sufficient to permit of a fairly wide range of adjustability.

In the equipment of existing airplanes with apparatus of the type shown, the feature of adjustability will prove advantageous, as standardized actuators and supporting arms may be applied to ailerons of various dimensions, the proper or necessary leverage being obtained by the adjustment of the actuator within its supports, as described.

In the structure shown in Figures 4 and 5, in lieu of the parallel arms 9 and 10, I provide a support for the actuator 12 which is of a truss construction, as shown at 20, the actuator being rotatably mounted in the bifurcated end thereof, formed by the offset and parallel extensions 21 and 21ª. As in the showing of the preceding figures, the actuator is moved by means of the wires or cables 15 passing through a common centre, as the pulleys 18 and 19, the manual movement of the actuator to a negative angle of incidence effecting the movement of the aileron to a positive angle and vice versa, as in the structure previously described.

It will, of course, be evident that an actuator is carried by, or connected to, each aileron or flap, the latter being movable simultaneously in opposite directions, as at present, in maintaining lateral stability of the aircraft, such movement of the ailerons or flaps being accomplished by the simultaneous manual movement of the respective actuators.

In Figures 6 and 7 of the drawings, I have illustrated means for functioning the rudder by the manual or other movement of a small surface or actuator, in accordance with the present invention, while in Figure 8 a method of operating the elevator is shown. With particular reference to Figures 6 and 7, the rudder 22 is hinged at 23 to the tailpiece 24 and the vertical fin 24ᵇ of an airplane of a conventional type, in the usual manner, for controlling the movement of the plane upon its vertical axis.

Located outwardly of one side of the tailpiece 24, preferably adjacent to the rudder end thereof, is an actuator 12 rotatable upon a shaft or axle 11 fixed or mounted within a slide block or carriage 25 having a portion formed for movement within the arcuate slot 26 of the guideway 27, the latter of which may be immovably secured to the side of the tail-piece in any suitable manner. In lieu of the slotted guideway, a curved rib or track may be used, the block or carriage 25 having a surface complemental thereto so as to cooperate therewith for the purposes which will hereafter become apparent.

As in the structure previously described, the actuator 12 is provided with levers or arms 13 and 14 to which the wires or cables 15, passing between the pulleys 18 and 19, are connected, these wires running to the inside of the plane, and through a common centre to the operating medium, which may be a foot-bar (not shown) located conveniently to the aviator or pilot.

Pivoted at 28 to the side of the tail-piece 24 is a bell-crank lever, the long arm 29ª of which is slotted at 29ᵇ and rides upon the axle or shaft 11 of the actuator 12. The shorter arm 29ᶜ of said bell-crank lever is connected by a link 30 to the horizontally disposed lever or arm 31 fixed to the face of the rudder 22 (see Fig. 8), the connections between the shorter arm of the bell-crank and the link 30 and between the latter and the rudder arm 31 being of a universal type. Obviously, any form of universal joint may be employed, the connections in the present showing being of the ball and socket type, as indicated at 32 and 33.

In Figure 7 the relative positions of the several elements are shown when the rudder has been moved or turned to the right to similarly change the direction of the forward movement of the airplane. To accomplish this, the actuator is first rotated to the requisite positive angle of incidence on its shaft or axle 11, through the medium of the wires or cables 15, the pressure of the air impinging thereagainst tending to force or move it upwardly, carrying with it the slide block or carriage 25, whose movement is guided and limited by the guideway on which it travels. As the actuator 12 is pressed upwardly by the force of the air, the bell-crank lever, the slotted end of which is in engagement with the axle or shaft 11 is rocked or rotated upon its pivot 28. The thrust thus imparted to the link 30 effects the movement of the rudder or vertical control surface, through the medium of the universal joints. Manifestly, the initial movement of the actuator 12 to a negative angle of incidence will result in the downward movement of the slide 25 along its guideway 26 and the rocking of the bell-crank lever upon its pivot 28 to exert a pull upon the link 30 and move the rudder in the opposite direction, that is, to the left. It will be clearly understood that the movement of the rudder may be initiated and positively controlled to the desired degree by the manipulation of the small surface or actuator, the angularity imparted to the latter governing the extent of the movement of the rudder.

In Figure 8 the elevator 34 hinged at 35 to the tail surface 24ª is functioned by the actuator 12ª, located on the side of the fuselage tail-piece 24 opposite to that from which the rudder actuator is supported. The actuator 12ª, like the actuator 12, is provided with levers connected by wires or cables 15 passing between pulleys indicated at 18ª and to the interior of the fuselage to the operating element, which may be the joy-stick. The shaft or axle 11ª of the actuator 12ª is similarly fixed to a slide or carriage 25ª moving upon or within a guideway, the slotted end of the long arm of the bell-crank lever 29 riding upon said shaft or axle, so that as the slide moves up or down under the control of the aviator and in response to the air pressure upon the actuator supported therefrom, the bell-crank will rock upon its pivot to raise or lower the elevator, through the medium of the link 30ª and its universal connections with the short arm of the bell-crank and the elevator arm or lever 35. As will be apparent, to raise the elevator or tail flap, the actuator 12ª is turned at a negative angle of incidence and vice versa.

As in the arrangements shown in Figures 1 to 5 inclusive, the vertical surface or rudder 22 and the elevator 34 are operated by the pressure of the air impinging against their respective actuators, when the latter relatively small surfaces are moved, either manually or otherwise. It will be clearly seen that the resistance to the movement of these small surfaces will be comparatively negligible so that their operation will require little physical effort on the part of the aviator or pilot. As they are turned to the necessary degree of angularity, under the guidance of the aviator or pilot, the air pressing against their surfaces will supply ample power to move the larger control surfaces through any arc desired, by the utilization of the forces of leverage which may be made available with suitable connections, such, for example, as illustrated.

While, in the illustrative forms of means shown, I have located the actuators adjacent to the control surfaces which they operate, equally satisfactory results in the practicing of my invention may be obtained from remote locations. The arrangement of the wires or cables by means of which the actuators are manipulated insures the maintenance of the angularity to which the actuators are moved, during the entire movement of the control surface to its functioning position, or until the angularity is changed at the will of the operator, and also permits of regulating the variation of the angle of the actuator when in its normal or original position.

From the preceeding description of my invention, it will be seen that I have devised a simple and extremely practical method of overcoming the difficulties which are inherent to the operation of control surfaces of relatively large areas, by the manual means now employed. Of course, my invention is in no way limited to the functioning of large surfaces, as it may be utilized to great advantage in the operation of any directional control surface, irrespective of its size, whether embodied in or associated with an air or water craft, or with any other form of vehicle, in which the pressure of a fluid or gas against a surface may be converted into useful effort in the operation and functioning of such directional control surface or medium.

I claim:

1. In combination with the usual vertical rudder and elevator carried at the rear end of the fuselage, two actuating surfaces positioned on opposite sides of the fuselage at the rear end thereof, and bell crank levers operatively connecting one actuating surface with the rudder and the other actuating surface with the elevator.

2. In combination with the usual vertical rudder and elevator carried at the rear end of the fuselage, two horizontally disposed actuating surfaces positioned on opposite sides of the fuselage each pivoted to move on a horizontal axis, and means operatively connecting one actuating surface with the rudder and the other actuating surface with the elevator.

3. In combination with the usual vertical rudder and elevator carried at the rear end of the fuselage, two actuating surfaces positioned on opposite sides of the fuselage each pivoted to move on a horizontal axis, and means including levers pivoted to the fuselage operatively connecting one actuating surface with the rudder and the other actuating surface with the elevator.

ANTHONY H. G. FOKKER.